(12) United States Patent
Rangachari et al.

(10) Patent No.: US 12,160,259 B2
(45) Date of Patent: Dec. 3, 2024

(54) LOW POWER DIGITAL MODES FOR DUTY-CYCLED INTEGRATED TRANSCEIVERS

(71) Applicant: Texas Instruments Incorporated, Dallas, TX (US)

(72) Inventors: Sundarrajan Rangachari, Trichy (IN); Nagalinga Swamy Basayya Aremallapur, Ranebennur (IN); Kalyan Gudipati, Bengaluru (IN); Divyeshkumar Mahendrabhai Patel, Mehsana (IN); Venkateshwara Reddy Pothapu, Bengaluru (IN); Aravind Vijayakumar, Chennai (IN); Sarma Sundareswara Gunturi, Bengaluru (IN); Jaiganesh Balakrishnan, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 269 days.

(21) Appl. No.: 17/544,795

(22) Filed: Dec. 7, 2021

(65) Prior Publication Data
US 2022/0182098 A1 Jun. 9, 2022

(30) Foreign Application Priority Data
Dec. 9, 2020 (IN) .............................. 202041053749

(51) Int. Cl.
*H04B 1/40* (2015.01)
*H04B 1/04* (2006.01)

(52) U.S. Cl.
CPC ............. *H04B 1/40* (2013.01); *H04B 1/0483* (2013.01); *H04B 2001/0425* (2013.01); *H04B 2001/0433* (2013.01)

(58) Field of Classification Search
CPC .......... H04B 1/1615; H04B 1/38; H04B 1/40; H04B 1/401; H04B 1/0483;
(Continued)

(56) References Cited

U.S. PATENT DOCUMENTS

| | | | |
|---|---|---|---|
| 7,317,691 B2 * | 1/2008 | Mills ...................... | H04L 12/12 370/252 |
| 7,327,754 B2 * | 2/2008 | Mills ...................... | H04L 12/12 713/320 |

(Continued)

FOREIGN PATENT DOCUMENTS

KR 20180052539 A * 5/2018 ........... G06F 1/3287

OTHER PUBLICATIONS

"Method and Apparatus for Providing Individualized Power Control for Peripheral Sub-Systems", KR 20180052539 A (English Text), Garg et al., May 18, 2018. (Year: 2018).*

*Primary Examiner* — Quochien B Vuong
(74) *Attorney, Agent, or Firm* — Valerie M. Davis; Frank D. Cimino

(57) ABSTRACT

A technique for reinitializing a coupled circuit, the technique including receiving a common configuration value associated with states of a coupled circuit, tracking states associated with the coupled circuit while the coupled circuit is in a low power state based on the common configuration value, receiving the tracked state associated with the coupled circuit, receiving a scaling value associated with the coupled circuit, determining a current state of the coupled circuit based on the tracked state and the scaling value, and transmitting an indication of the current state to the coupled circuit when the coupled circuit has exited the low power state.

22 Claims, 9 Drawing Sheets

(58) Field of Classification Search
CPC .... H04B 2001/0416; H04B 2001/0425; H04B 2001/0433
See application file for complete search history.

(56) References Cited

U.S. PATENT DOCUMENTS

| | | | |
|---|---|---|---|
| 11,564,186 B2 * | 1/2023 | Morsy | H04W 56/0015 |
| 11,741,030 B2 * | 8/2023 | Safranek | G06F 8/77 370/389 |

* cited by examiner

LOW POWER DIGITAL MODES FOR DUTY-CYCLED INTEGRATED TRANSCEIVERS

CROSS-REFERENCE TO RELATED APPLICATION

This patent application claims the benefit of and priority to Indian Patent Application No. 202041053749 filed on Dec. 9, 2020, which is hereby incorporated herein by reference in its entirety.

BACKGROUND

Wireless systems usually include wireless transceivers used to transmit and receive wireless signals. Wireless transceivers include one or more transmit and receive chains that function to transmit and receive, respectively, the wireless signals. The transmit chains include a set of coupled circuits that convert a digital signal to a properly formatted analog signal (appropriate for the wireless system) and output the formatted analog signal to an antenna. Similarly, the receive chain includes a set of coupled circuits which receive an analog signal from an antenna and convert the analog signal to a digital signal.

Certain wireless systems operate based on a duty cycle where one or more portions of the wireless transceiver are not actively used. For example; in time-division duplex (TDD) systems, transmit and receive times are interlaced and the wireless receiver may switch between transmitting and receiving based on a time schedule. As wireless devices often are battery powered, reducing power consumption by the wireless transceiver is desirable.

SUMMARY

This disclosure relates to techniques for reinitializing a coupled circuit. The technique includes receiving a common configuration value associated with a coupled circuit tracking a state associated with a coupled circuit while the coupled circuit is in a low power state based on the common configuration value. The technique also includes detecting that the coupled circuit is exiting the low power state. The technique also includes receiving a scaling value associated with the coupled circuit. The technique also includes determining a current state of the coupled circuit based on the tracked state and the scaling value, and transmitting an indication of the current state to the coupled circuit.

Another aspect of the present disclosure includes a reinitializing circuit. The reinitializing circuit includes a state tracking module. The state tracking module includes a combiner configured to receive a common configuration value and an accumulator configured to track a state associated with a coupled circuit while the coupled circuit is in a low power state based on the common configuration value, wherein the coupled circuit is coupled to the reinitializing circuit. The reinitializing circuit includes a reinitialization module coupled to the state tracking module. The reinitialization module is configured to detect that the coupled circuit is exiting the low power state. The reinitialization module is further configured to receive the tracked state associated with the coupled circuit. The reinitialization module is further configured to receive a scaling value associated with the coupled circuit. The reinitialization module is further configured to determine a current state of the coupled circuit based on the tracked state and the scaling value; and transmit an indication of the current state to the coupled circuit.

Another aspect of the present disclosure includes a circuit for updating a state comprising a flip-flop configured to receive a state update signal when the flip-flop is clock gated. The flip-flop is configured to reset a state of the flip-flop based on the state update signal and output the state of the flip-flop. The circuit also includes a detector circuit coupled to the flip-flop. The detector circuit is configured to receive a clock signal when a clock is ungated. The detector circuit is further configured to determine the state of the flip-flop has changed and generate a state update pulse signal for output to a coupled circuit.

Another aspect of the present disclosure includes a technique including receiving, by a flip-flop, a state update signal when the flip-flop is clock gated. The technique further includes resetting a state of the flip-flop based on the state update signal. The technique further includes outputting the state of the flip-flop. The technique further includes receiving, by a detector circuit coupled to the flip-flop, a clock signal when a clock is ungated. The technique further includes determining the state of the flip-flop has changed and generating a state update pulse signal for output to a coupled circuit.

BRIEF DESCRIPTION OF THE DRAWINGS

For a detailed description of various examples, reference will now be made to the accompanying drawings in which.

The same reference numbers or other reference designators are used in the drawings to designate the same or similar (functionally and/or structurally) features.

DETAILED DESCRIPTION

Figure 1:
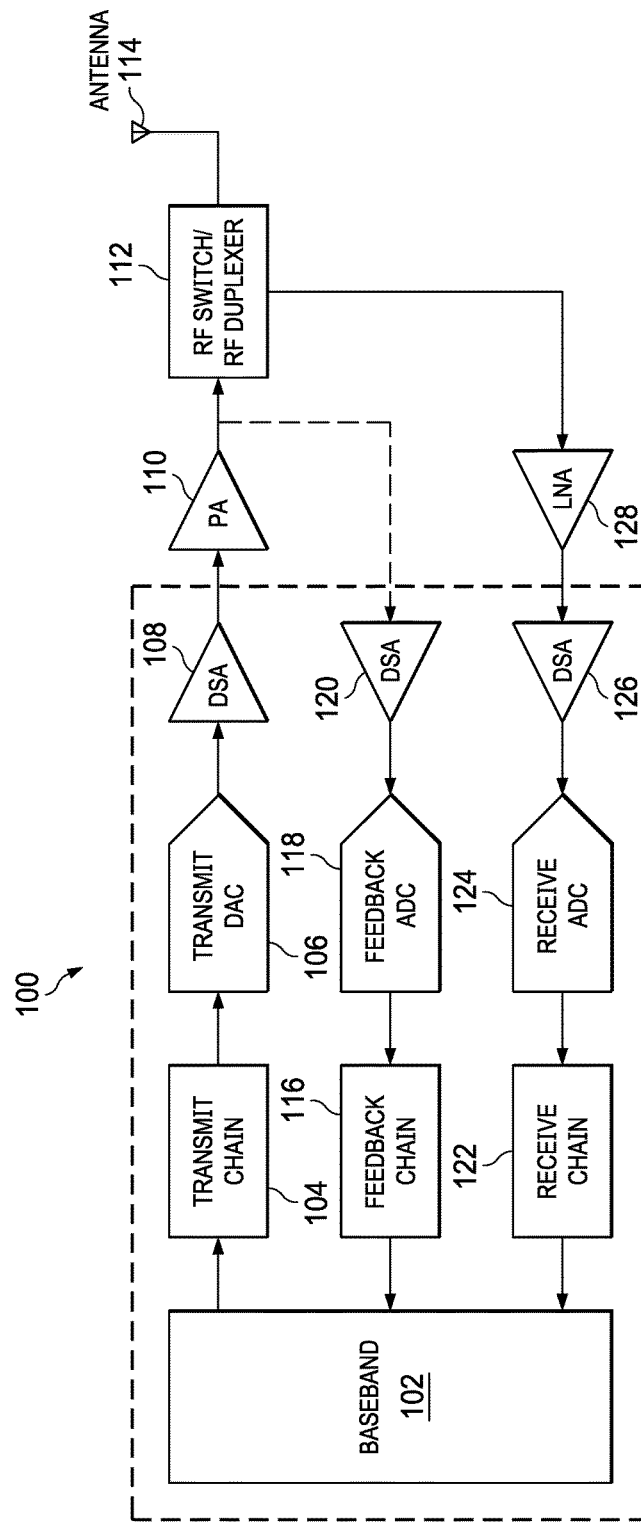
FIG. 1 is block diagram of a transceiver, in accordance with aspects of the present disclosure.

FIG. 1 is a block diagram of a wireless transceiver 100, in accordance with aspects of the present disclosure. As shown, wireless transceiver 100 includes a baseband processor 102 (e.g. a digital signal processor, a microcomputer, an application specific integrated circuit (ASIC), digital circuitry, memory, field programmable gate array (FPGA) and/or any combination thereof). The baseband processor 102 is a processor that manages the radio functionality via one or more wireless chains, such as a transmit chain 104, a receive chain 122, and a feedback chain 116. In this example, the baseband processor 102 is coupled to the transmit chain 104, the feedback chain 116, and the receive chain 122. The transmit chain 104 (e.g. a processor, digital circuitry, analog circuitry, an ASIC, an FPGA, a digital-to-analog converter (DAC) and/or any combination thereof) includes a set of circuits coupled together which receives a digital signal output from the baseband processor 102 and converts the digital signal into a format appropriate for transmission by the wireless system. This converted digital signal is then input to the transmit digital-to-analog converter (DAC) 106 where it is converted to an analog signal. This analog signal is then passed through a digital step attenuator (DSA) 108 to adjust the gain of the analog signal and then output to a power amplifier (PA) 110, which amplifies the analog signal. The PA 110 may be coupled via an RF switch or RF duplexer 112 to an antenna 114. In some examples, the wireless transceiver 100 may operate in a half duplex mode, and a wireless transceiver can operate in either a receive or transmit mode based on the RF switch or RF duplexer 112.

In some examples, the signal being transmitted by the wireless transceiver 100 may be fed back into the baseband 102 as illustrated by the dashed line. In this example, an output of the PA 110 may be input to DSA 120, and DSA 120 adjusts the gain of its analog input signal. The output of the DSA 120 is input to a feedback analog-to-digital converter (ADC) 118 to convert the analog signal to a digital signal, and then output to the feedback chain 116 (e.g. a processor, digital circuitry, analog circuitry, an ASIC, an FPGA and/or any combination thereof). The feedback chain 116 also includes a set of circuits coupled together which receive a digital signal output from the feedback ADC 118 and adjusts the signal for output to the baseband 102. The feedback signal may be used, for example, to control the power of the transmission, stabilize the transmitted signal, adjust a phase and amplitude of the transmitted signal, etc.

The wireless transceiver 100 may receive an analog signal via antenna 114 which is routed via the RF switch or RF duplexer 112 to a low noise amplifier (LNA) 128 to amplify the analog signal. The output of the LNA 128 is input to DSA 126, and DSA 126 adjusts the gain of the analog signal. In this example, the output of the DSA 126 is input to a receive ADC 124 to convert the analog signal to a digital signal, and then output to a receive chain 122 (e.g. a processor, digital circuitry, analog circuitry, an ASIC, an FPGA and/or any combination thereof). The receive chain 122 also includes a set of coupled circuits which receive a digital signal output from the receive ADC 124 and formats the signal for output to the baseband 102.

Figure 2:
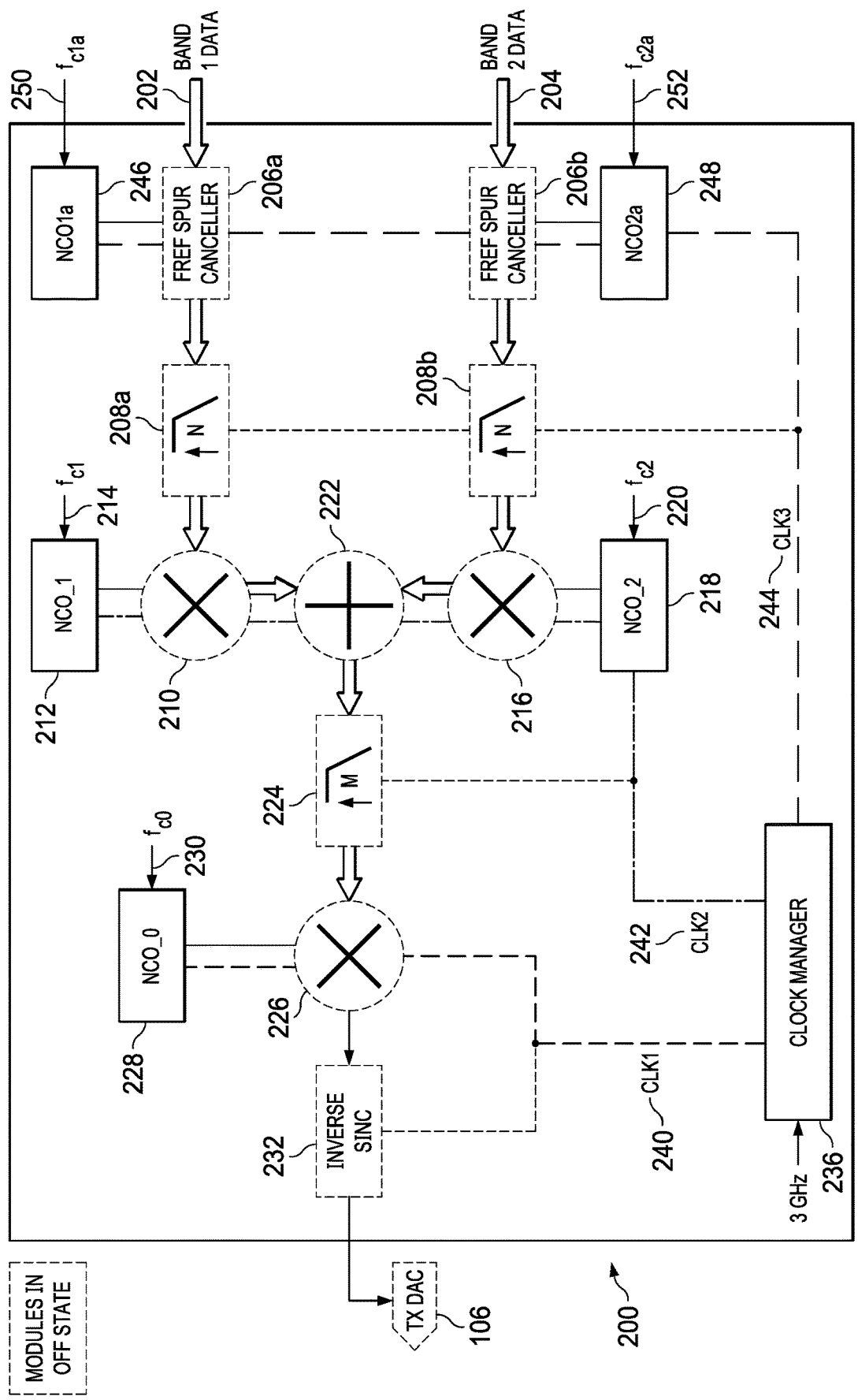
FIG. 2 is block diagram of a transmit chain, in accordance with aspects of the present disclosure.

FIG. 2 is block diagram of a transmit chain 200, in accordance with aspects of the present disclosure. The example transmit chain of FIG. 2 may be used to implement transmit chain 104 in FIG. 1. The techniques disclosed herein are applicable to multiple types of duty-cycled digital circuits, including, but not limited to, receive and feedback chains of a transceiver. In the example of FIG. 2, a clock manager 236 and associated clock tree provides multiple reference clock signals ("clocks" for short) at various frequencies to various components of the transmit chain 200. The various clocks are referred to as a "clock tree." In this example, reference clocks are provided to numerically-controlled oscillators (NCOs) 228, 212, 246, 248, and 218, up-samplers 208a, 208b (208a and/or 208b are collectively referred to as 208) and 224, and inverse Sinc filter 232.

The clock manager 236 generates and provides a first clock (CLK1) 240, a second clock (CLK2) 242, and a third clock (CLK3) 244. As shown in this example, the transmit chain 200 receives, for example from baseband processor 102, data streams for two frequency bands, shown as Band 1 data 202 and Band 2 data 204. The data streams flow through reference frequency (fREF) spur cancellers 206a and 206b (collectively 206), which help filter spurious frequencies and noise that may be introduced, for example by clock coupling as between electrical components of the circuit. These spurious frequencies and noise may be found at predictable frequencies and these frequencies may be provided by NCOs. In this example, spur canceller 206a is coupled to a first NCO 246 and spur canceller 206b is coupled to a second NCO 248, which have frequencies based on the frequency of the third clock 244 and center frequencies $f_{c1a}$ 250 and $f_{c2a}$ 252, respectively. Output from the fREF spur canceller 206a may be up-sampled to increase the sampling rate of the data streams by up-sampler 208a and then mixed. Similarly, output from the fREF spur canceller 206b may be up-sampled by up-sampler 208b and then mixed. In this example, Band 1 data 202 is input to spur canceller 206a; the output of spur canceller 206a is provided to up-sampler 208a; and the output of up-sampler 208a is output to a first mixer 210, which upconverts the data associated with Band 1 data 202 to be centered around a first frequency based on a frequency of a third NCO 212. The frequency of the third NCO 212 is based on a center frequency $f_{c1}$ 214 and a clock, such as second clock 242.

Similarly, Band 2 data 204 is input to spur canceller 206b; the output of spur canceller 206b is provided to up-sampler 208b; and the output of up-sampler 208b is output to a second mixer 216, which upconverts the data associated with Band 2 data 204 to be centered around a second frequency based on a frequency of a fourth NCO 218. The frequency of the fourth NCO 218 is based on a center frequency $f_{c2}$ 220 and the second clock 242. As the two data streams are centered around different frequencies, the data streams output by the first mixer 210 and the second mixer 216 may be combined by combiner 222 and further up-sampled by up-sampler 224. In this example, the up-sampler 224 may output to a third mixer 226 which further upconverts the combined data to be centered around a third frequency based on a frequency of a fifth NCO 228. The frequency of the fifth NCO 228 is based on a center frequency $f_{c0}$ 230 and the first clock 240. The output of the third mixer 226 may be input to an inverse Sinc filter 232, for example, to help remove amplitude errors that may have been introduced. The output of the inverse Sinc filter 232 may be input to a transmit DAC 106 for conversion to an analog signal.

In some examples, a transceiver may operate on a duty cycle where one or more portions of the transceiver may not be in use at certain times. For example, in a TDD mode of operation, the transceiver may switch between transmit and receive modes of operation. During the transmit mode of operation, the receive chain and associated circuitry are not used, and during the receive mode of operation, the transmit and feedback chains are not used. Power savings may be realized by turning off (e.g., entering a low power state) portions of the transceiver which are not in use. For example, portions of the wireless chains may be turned off when not in use.

Figure 3:
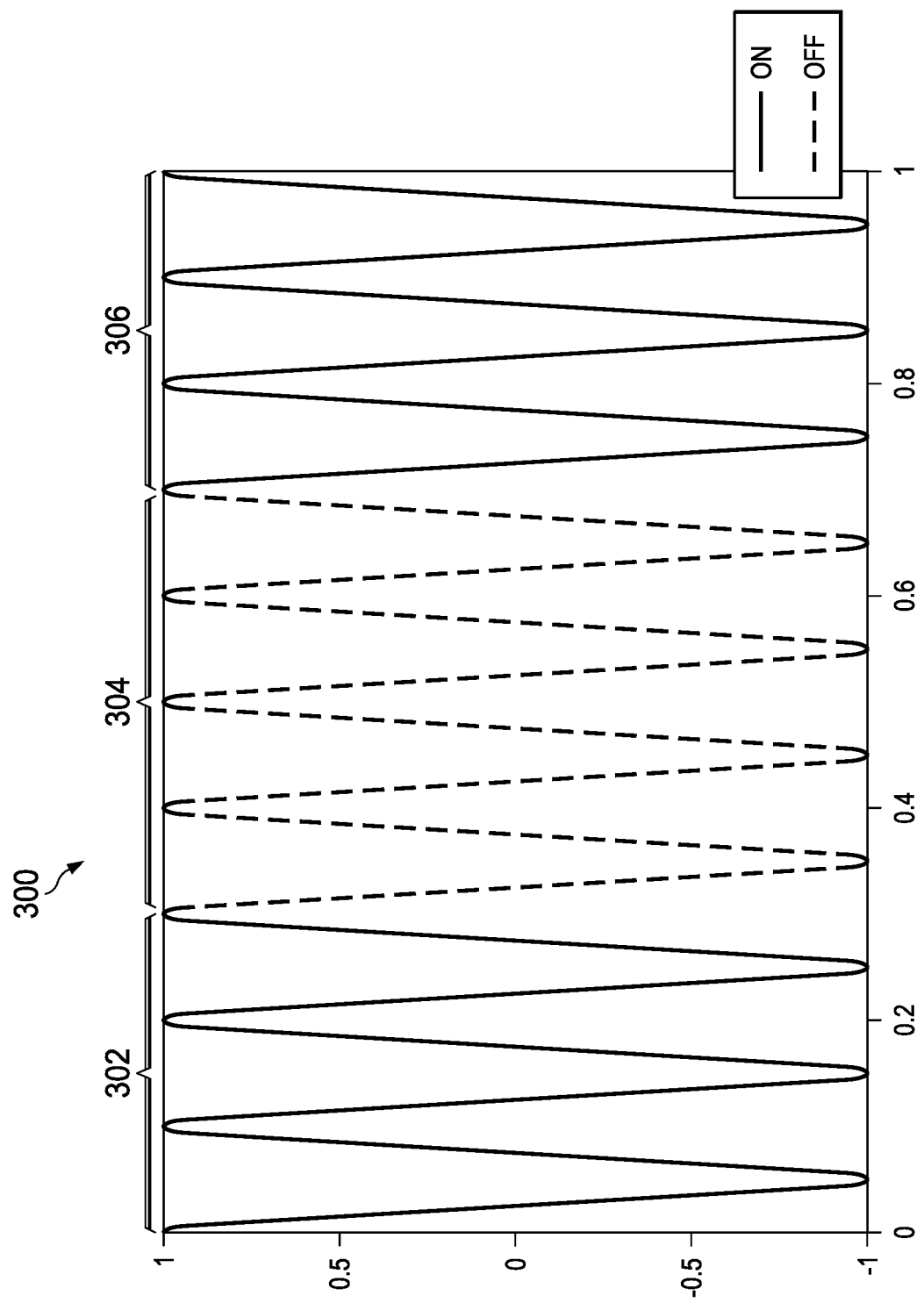
FIG. 3 is a waveform diagram, in accordance with aspects of the present disclosure.

FIG. 3 illustrates a waveform 300 with a certain phase. The phase refers to the relationship between positions of the amplitude crest and trough of multiple waveforms. As shown, the "on" portions of waveform 300 are illustrated as on epoch 302 and on epoch 306, and the "off" portion of the waveform 300 is illustrated as an off epoch 304. During the off epoch 304, the waveform does not exist, but the waveform phase may be maintained such that for the subsequent on epoch 306, the waveform remains in phase as if the waveform had not been turned-off. Maintaining the phase of the waveform between different instances of the transmit or receive modes of operation helps reduce the potential for phase shifts, which otherwise may introduce multipath, beam alignment, beamforming parameter changes, invalidate channel estimates, or other issues. Maintaining the latency as between portions of the transceiver helps ensure transmit and receive operations are performed at the expected times.

To help maintain the phase and latency for the wireless chains (such as between different epochs of operating in a transmit mode, that is turning off portions of the wireless chain and resuming operating in a transmit mode), portions of the wireless chain may remain powered on, while other portions of the wireless chain may be turned off. Returning to FIG. 2, as an example of how portions of the wireless chain may be turned off, those portions of the wireless chain to be turned off may be data and/or clock gated such that they do not consume power. The portions of a wireless chain that remain powered on (while other portions of that wireless chain may be powered down—e.g., enter a relatively lower power state) are considered a part of an always-on-domain (AoD). In some examples, this AoD may include, NCOs 228, 212, 246, 248, and 218, along with the clock manager. The NCOs create a discrete valued representation of a waveform (e.g., frequency control word (FCW)) based on an input clock and center frequency. For example, the center frequency may be an oscillating signal centered around a certain frequency wave, such as a sine/cosine wave. The NCO operates at the rate of the input clock and on each clock cycle, the NCO samples the waveform and determines a value, such as a sin/cos value, of the waveform as the FCW. The NCOs may include a phase accumulator and a phase-to-amplitude converter. The phase accumulator adds the FCW at each clock cycle and outputs this value to the phase to amplitude converter, which then generates a waveform based on this value and the FCW. Maintaining power to the NCOs, clock controller, and associated clock tree (which couples the clock to other devices), helps to ensure that the phase accumulator value of the NCOs is maintained to help maintain the phase during the off epoch.

Figure 4:
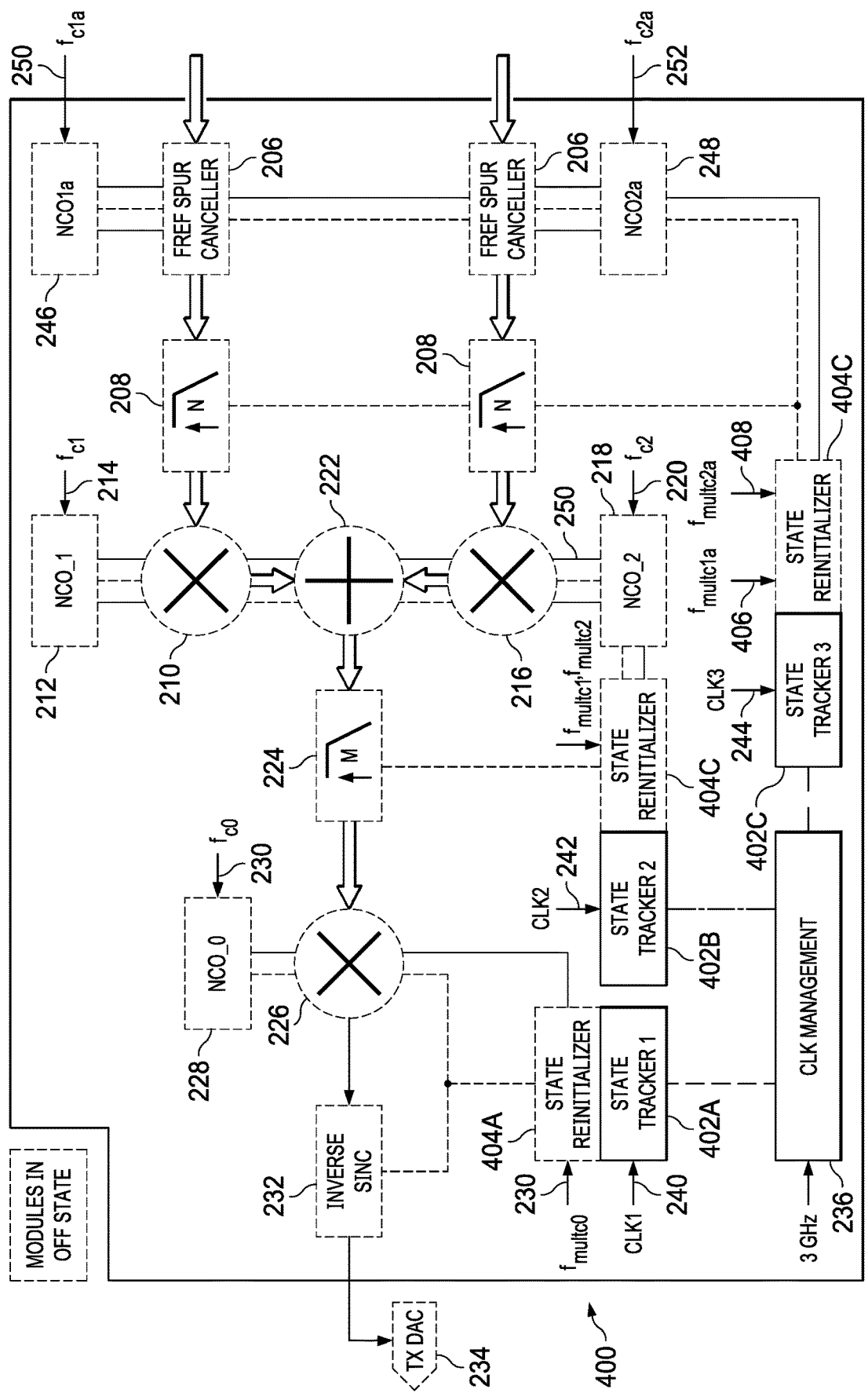
FIG. 4 is a is block diagram of a transmit chain, in accordance with aspects of the present disclosure.

FIG. 4 is another block diagram of a transmit chain 400, in accordance with aspects of the present disclosure, which also may be used to implement transmit chain 104 in FIG. 1. As shown, transmit chain 400 is largely similar to transmit chain 200, but couples state trackers 402A, 402B and 402C (collectively, state trackers 402) and state re-initializers 404A, 404B and 404C (collectively, state re-initializers 404) between the clock manager 236 and devices which receive a reference clock, such as NCOs 228, 212, 246, 248, and 218, up-samplers 208 and 224, and inverse sinc filter 232. The state trackers 402 help track a state, such as a phase, clock, control word, etc., of the coupled datapath modules when such modules are powered down. In some examples, separate state trackers 402 may be provided for different clock rates. For example, a first state tracker 402A may operate at a frequency of a first clock 240, second state tracker 402B may operate at a frequency of a second clock 242, and a third state tracker 402C may operate at a frequency of a third clock 244.

The value of the state trackers 402 can be used by the state re-initializers 404 to determine another value that can be used to reinitialize a coupled circuit, such as the NCOs. For example, the state trackers 402, such as state tracker 402C, may receive an FCW based on an input clock frequency, such as the frequency of the third clock 244. The state tracker 402 may accumulate the base FCW as a phase. The state re-initializers may receive a scaling value or multiplier, such as multiplier $f_{multc1a}$ 406 and multiplier $f_{multc2a}$ 408, that may be used to determine a current value to reinitialize the coupled circuit. In some examples, the scaling value may be a ratio of the base FCW of the state tracker 402 to the center frequencies $f_{c1a}$ 250 and $f_{c2a}$ 252 for the corresponding NCOs, the first NCO 246 and the second NCO 248. As an example, the scaling value may be a numerical value that may be multiplied with the base FCW to determine a center frequency. This multiplier may be a numerical value that operates as a function value for converting the state tracker phase to the current phase value of the coupled circuits would have had the coupled circuits not been powered down. For example, state re-initializer 404A may receive a multiplier (such as, an integer value) for converting the state tracker phase to the phase of the coupled fifth NCO 228. As discussed above, an NCO may generate a discrete valued representation (e.g., phase) of a waveform based on an accumulator value that is adjusted based on the input FCW and multiplier value from the state re-initializer 404. In some examples, the scaling value may be predetermined, for example, when the circuit is designed and/or manufactured.

Based on an input state tracking value (e.g., phase of the common state tracker ($FCW_{LSB}$)) and the input multiplier value, the state re-initializers 404 can determine a current value for the NCO that is consistent with a value the NCO would have had if the NCO had not been turned-off. The state re-initializer 404 may then reinitialize the NCO with the current value. In some examples, if the state re-initializer 404 is associated with multiple NCOs having different frequency values, such as NCOs 246 and 248 and multiplier values $f_{c1a}$ 250 and $f_{c2a}$ 252, the state re-initializer, such as state re-initializer 404C, may be configured to receive multiple multiplier values and to determine multiple current values of the multiple NCOs based on the state tracking value and the multiple multiplier values. On power up, the state re-initializers 404 are powered up and the state trackers 402 provide the state tracking value to the state re-initializers, which then determines the current value of the coupled NCO(s) and provides the current value to the NCOs. This current value provided to the NCOs may represent the value that the NCO would have had if the NCO had not been powered down. The NCOs may then continue to operate as if the NCOs had not been powered down. As the NCOs may be reinitialized by the state trackers 402 as if the NCOs had not been powered down, the NCOs may be placed outside of the AoD.

It may be understood that while the state trackers 402 and state re-initializers 404 are shown as separate entities, the state trackers 402 and state re-initializers 404 may be integrated with another component, such as a part of the clock manager 236. In some examples, the state trackers 402 may be located relatively close to the clock manager 236. Locating the state trackers 402 relatively close to the clock manager 236 helps minimize an amount of the clock tree that is maintained within the AoD. It may be further understood that while in this example, the state trackers 402 and state re-initializers 404 are used to reinitialize NCOs, the state trackers and state re-initializers may be applied to any circuit which maintains a state based on the clock. Examples of these circuits include first-in, first-out circuits, spur canceller, M/N (M frequency to N frequency) re-sampler circuits, digital transmitter circuit states, etc.

Figure 5:
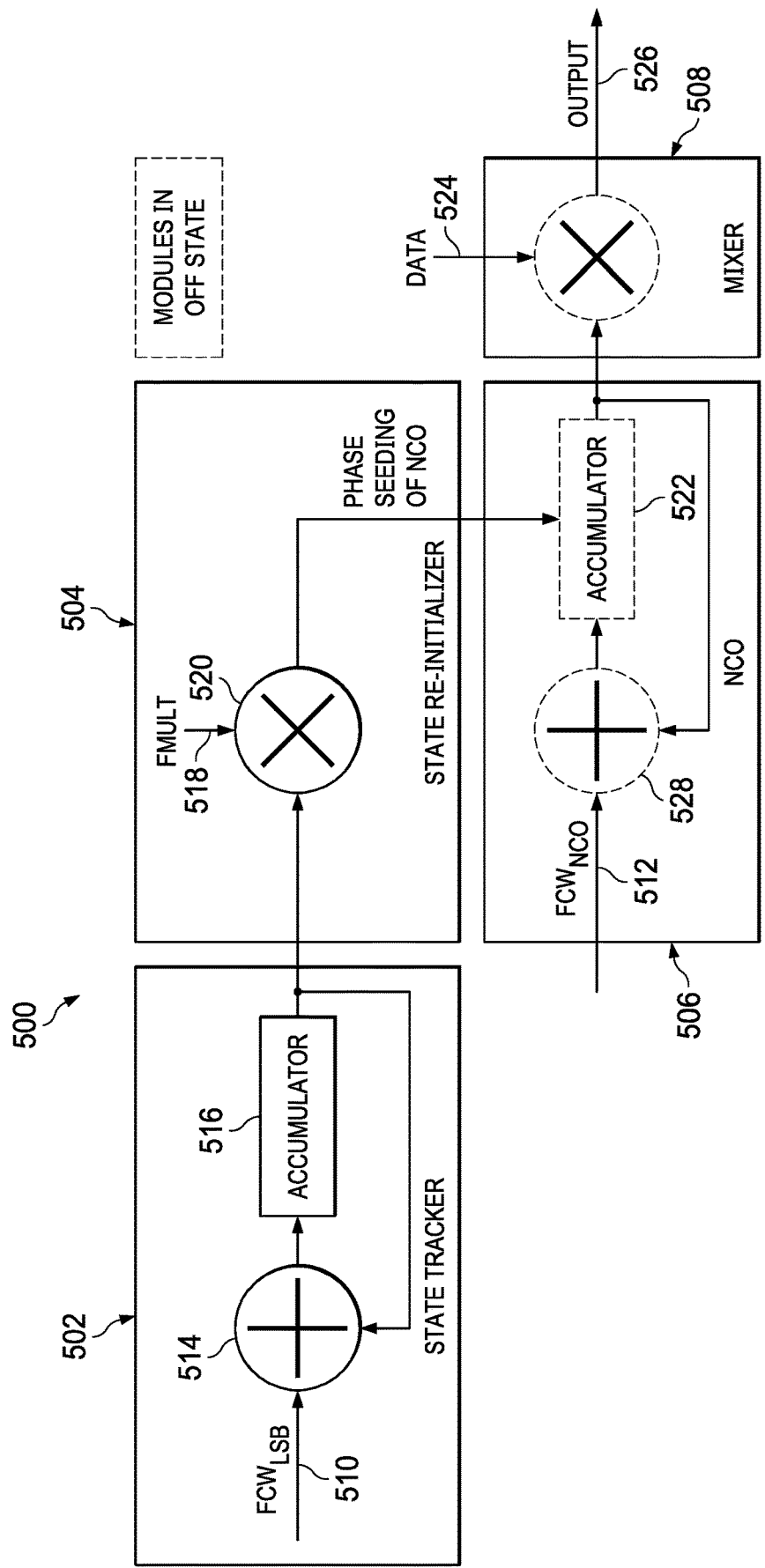
FIG. 5 is a block diagram of a circuit including a clock independent state update handler (CISUH), in accordance with aspects of the present disclosure.

FIG. 5 is a block diagram of circuit components 500, in accordance with aspects of the present disclosure. In this example, circuit components 500 include a state tracker 502, state re-initializer 504, NCO 506, and mixer 508. In some examples, state tracker 502, state re-initializer 504, NCO 506, and mixer 508 may correspond to state tracker 402A, state re-initializer 404A, NCO 228, and mixer 226, respectively, as shown in FIG. 4. State tracker 502 may receive, for example, a frequency control word (FCW) signal from a clock manager such as clock manager 236. In some examples, the FCW may be a common FCW from which all possible values of the FCWs (used by coupled datapath modules, such as $FCW_{NCO}$ 512 for NCO 506) may be derived. For example, assuming FCW values are integer values, a common $FCW_{LSB}$ 510 value passed into the state tracker 502 may be a common factor (e.g., the NCO FCW is evenly divisible by the common FCW) for the FCW of the coupled NCOs. This common factor may be a least common multiple (LCM) of the configuration values (e.g., FCW, clock, etc.) of the coupled circuit components. As a more detailed example, if the coupled NCO FCW are 8 KHz and 10 KHZ, the common FCW may be 2 KHz. In some examples, a generic LCM common to all frequencies, such as 1 KHz, may be used.

A given state tracker may be coupled to multiple datapath modules which may use different FCWs that can be derived as a function of the common FCW, e.g. $FCW_{LSB}$ 510. In some examples, a FCW may be determined, for example by a clock manager such as clock manager 236, to be $$FCW = \text{round}\left(\frac{f_c}{f_s} * 2^{N_b}\right) \quad (1)$$

where $f_c$ is a carrier frequency, $f_s$ is the sampling frequency of a coupled NCO (such as NCO 506), and $N_b$ is a number of bits for the $FCW_{NCO}$ 512. A $FCW_{LSB}$ may be calculated as a common factor of all possible FCW values used by the coupled NCOs. The $FCW_{LSB}$ may be predetermined, for example, when the circuit is designed or during testing or manufacturing.

In some examples, the state tracker 502 may operate substantially continuously regardless of whether a coupled datapath module has been clock-gated (e.g., regardless of whether the coupled circuit is in the low power state). In some examples, the state tracker 502 may operate when the coupled circuit is in the low power state, and the state tracker 502 may enter a low power state when the coupled circuit exits the low power state. The state tracker 502 may include an accumulator 516 and a combiner 514. The combiner 514 adds the received $FCW_{LSB}$ 510 value to the value stored in accumulator 516. Assuming that the value of the received $FCW_{LSB}$ 510 is K, the state tracker 502 then accumulates the value of the received $FCW_{LSB}$ 510 with itself each clock cycle such that the progression of the value in the accumulator is 0K, K, 2K, 3K . . . 35K, . . . n−1K, nK, where n is the number of clock cycles.

As shown, NCO 506 may include an accumulator 522 and a combiner 528, which adds a received $FCW_{NCO}$ 512 to itself each clock cycle. However, the NCO 506 may be clock gated. Assuming that the value of the received $FCW_{NCO}$ 512 is P, the value in accumulator 522 may be 0P, P, 2P . . . . As an example, assume that $FCW_{LSB}$ 510 and $FCW_{NCO}$ 512 are started at the same time, and NCO 506 is clock gated when the value in accumulator 522 is 2P and the value in accumulator 516 is 2K. As the clock is not gated to state tracker 502, when the clock is resumed to NCO 506, the accumulator 516 of the state tracker 516 may have a value of, for example, 35K. If the NCO 506 had not been clock-gated, then the value in accumulator 522, for this example, would be 35P. However, as the NCO 506 was clock-gated, the value of accumulator 522 of the NCO 506 differs from what it would have been had the NCO 506 not been clock-gated.

The state re-initializer 504 may operate to determine a value that can be used to reinitialize a coupled circuit, such as the NCOs. The state re-initializer 504 may receive a multiplier 518, FMULT, based on an FCW of a coupled datapath module, such as $FCW_{NCO}$ 512. This multiplier 518 acts to convert the phase of the state tracker 502 to the phase of the NCO 506. In some examples, a desired phase, $\Phi_{NCO}$, of a coupled datapath module like a NCO at a given time instant n may be determined as $$\Phi_{NCO} = 2\pi \frac{FCW}{2^{N_b}} n \quad (2)$$

A phase of the state tracker 502, $\Phi_{tracker}$, operating at $FCW_{LSB}=1$ (510) may be determined as $$\Phi_{tracker} = 2\pi \frac{FCW_{LSB}}{2^{N_b}} n \quad (3)$$

Thus, a phase of the coupled datapath module, such as NCO 506, $\Phi_{NCO}$, may be determined as $$\Phi_{NCO} = \frac{FCW}{FCW_{LSB}} * \Phi_{tracker} \quad (4)$$

at multiplier 520. The determined phase of the coupled datapath module, such as NCO 506, $\Phi_{NCO}$, may then be used to seed an accumulator 522 of the datapath module, such as NCO 506, when powering up the datapath module. The mixer 508 may then upconvert data 524 based on the input phase of the datapath module for output 526. After clock signal is restored, the datapath module may resume determining its phase from $FCW_{NCO}$ 512.

In some examples, inputs, such as those associated with corrections, changes, and/or updates from a controller (e.g. to help the transceiver adapt to environmental conditions, such as temperature changes) may be received. For example, an input may be received adjusting a frequency value input to an NCO. These inputs may not be limited to being receive by the transmit chain. For example, a change to a DSA gain or phase error correction may be received by a DSA. In some examples, these inputs may be received when portions of the transceiver are powered off. Rather than maintaining the component and an associated clock tree (e.g. to provide a clock signal to the component) in an "on" state, to receive the input in the AoD, a clock independent state update handler (CISUH) may be provided.

Figure 6:
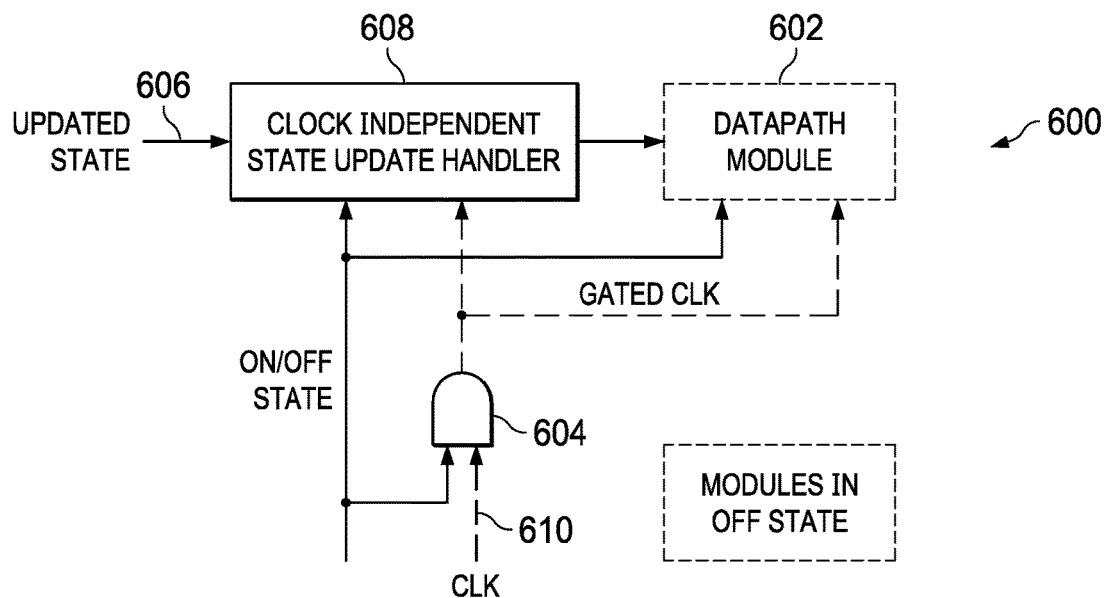
FIG. 6 is a block diagram of a circuit including a CISUH, in accordance with aspects of the present disclosure

FIG. 6 is a block diagram of a circuit 600 including a CISUH 608, in accordance with aspects of the present disclosure. As shown in FIG. 6, a datapath module 602, such as a DSA gain/phase corrector, and/or part of a transmit/receive/feedback chain, may be in an OFF state. For example, the datapath module 602 (e.g., component) may be gated, by AND gate 604, from clock signal CLK (e.g., clock gated) 610. Clock gated circuits may stop receiving a clock signal, allowing the flip-flops within the circuit to stop switching states, which reduces power consumption to those circuits. In this example, the datapath module 602 may be capable of receiving a state input 606, via CISUH 608, to update a configuration state of the datapath module 602. This state input 606 may be received and stored by a CISUH 608. As shown, the CISUH 608 receives, as input, a clock signal when powered on and the CISUH 608 is also gated 604 from the clock signal when the corresponding datapath module 602 is powered off (e.g., clock gated). In some embodiments, the CISUH 608 does not require a clock signal to operate. In some embodiments, a CISUH 608 may be added to any datapath module (e.g. data path module 602) capable of being clock gated and can receive input configuring the datapath module. The CISUH 608 detects, without relying on a clock signal, that a state update for a datapath module was received while the corresponding datapath module was in the clock gated state. The CISUH 608 also triggers a state update pulse to update the datapath module with the updated state values when the corresponding datapath module enters the on-state when the clock signal is restored to the corresponding datapath module. Thus, any state updates for the corresponding datapath module received while the datapath module is in the clock-gated state, may be applied when the datapath module enters the on-state.

Figure 7A:
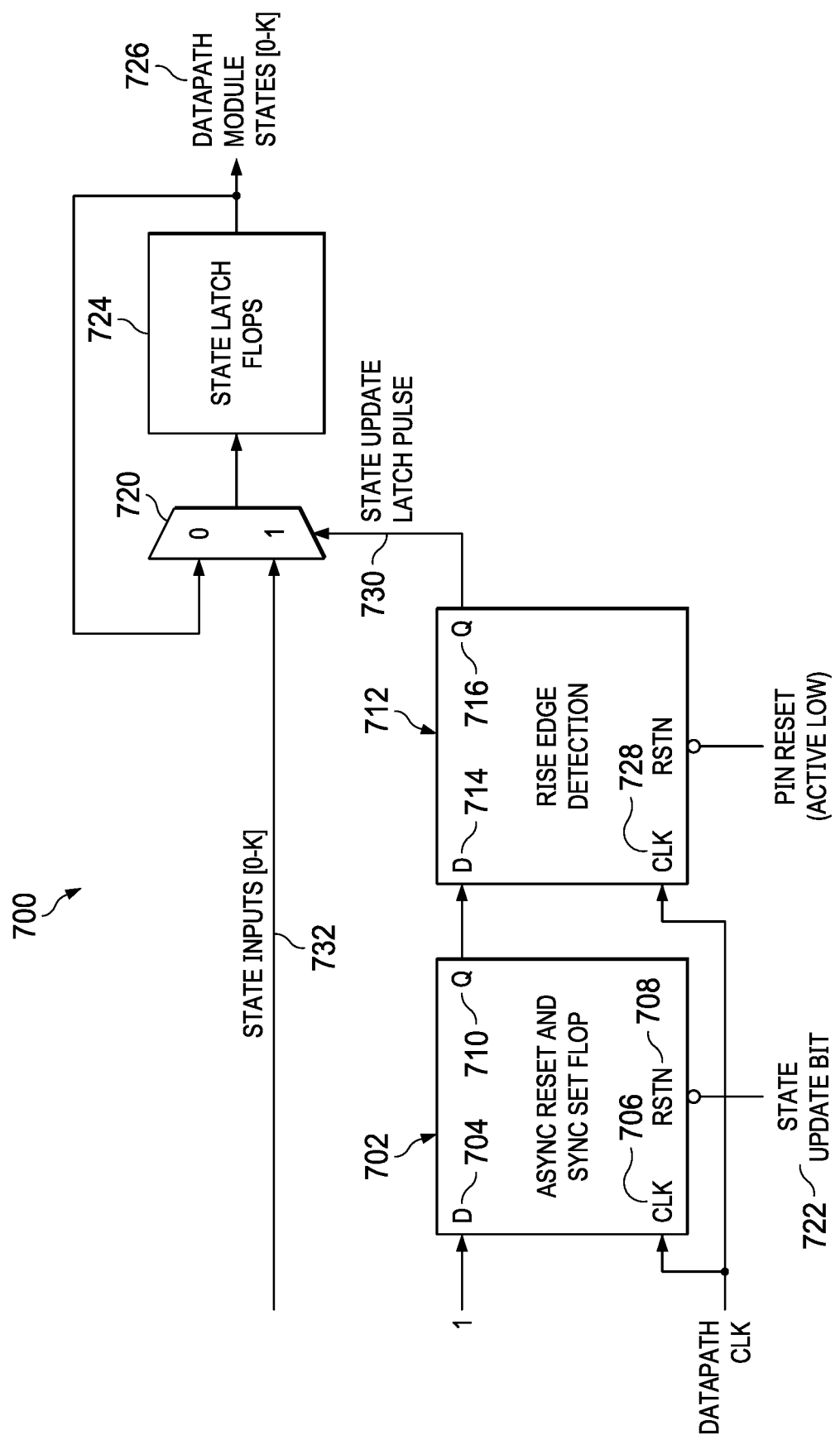
FIG. 7A is a block diagram illustrating an example CISUH, in accordance with aspects of the present disclosure

FIG. 7A is a block diagram illustrating an example CISUH 700, in accordance with aspects of the present disclosure. As shown, the CISUH 700 may include an asynchronous reset and synchronous set flip-flop 702 and a rising edge detection circuit 712. In some examples, the CISUH may be separate from, but coupled to a datapath module or the CISUH may be integrated into the datapath module. The CISUH 700 may include a mux (multiplexer circuit) 720 and state latch flip-flops 724 for receiving inputs to the datapath module. In this example, mux 720 is a 2:1 mux and connect new state inputs 732 to state latch flip-flops 724. In some examples, mux 720 may be configured to accept multi-bit inputs. For example, mux 720 includes inputs 0 and 1 and each input may be a multi-bit input from a bus. The state inputs 732 may correspond to state input 606 of FIG. 6. When no new state input is received, output of state latch flip-flops 724 is connected back to the input of state latch flip-flops 724 via mux 720 to retain the current value. It may be understood that CISUH 700 is an example of a circuit to detect whether a state update was received during an off-state epoch and generate a state update pulse upon entering an on-state epoch. The asynchronous reset and synchronous set flip-flop 702 may include a memory element configured to receive a set of inputs including input D 704, a clock input 706, and a reset 708. In some examples, input D 704 may be tied to a value, such as a 1. The clock input 706 may correspond to clock signal CLK 610 of FIG. 6 as presented via AND gate 604. The reset 708 clears the state of flip-flop 702, and in some embodiments, is connected to a state update bit 722. For example, when updating one or more state values, a state update bit 722 may be input at reset 708, clearing the output value of the asynchronous reset and synchronous set flip-flop 702. The asynchronous reset and synchronous set flip-flop 702 output will remain cleared even if the state update pulse is removed until the clock resumes. When the datapath module enters an ON state and the clock resumes, the output value of the flip-flop 102 will be set to the value connected to its D input which is 1. The asynchronous reset and synchronous set flip-flop 702 may then output a state Q 710 indicating that a state update signal has been received when the clock signal is present at clock input 706.

This changed value of state Q 710 from 0 to 1 (when the asynchronous reset and synchronous set flip-flop 702 enters the ON state) is input at input D 714 of a rising edge detection circuit 712. When the clock signal is present at the clock input 728 the rise edge detection circuit 712 may detect a rise edge clock and generate a state update latch pulse 730 from state Q 716. The state update latch pulse 730 may be input to a mux 720. Zero to K state input values 732 may be presented at a state latch flip-flops 724 through the mux 720 when the state update bit 722 is set. These state input values 732 may be input to state latch flip-flops 724 for adjusting the datapath module states 726 based on the input state update latch pulse 730.

Figure 7B:
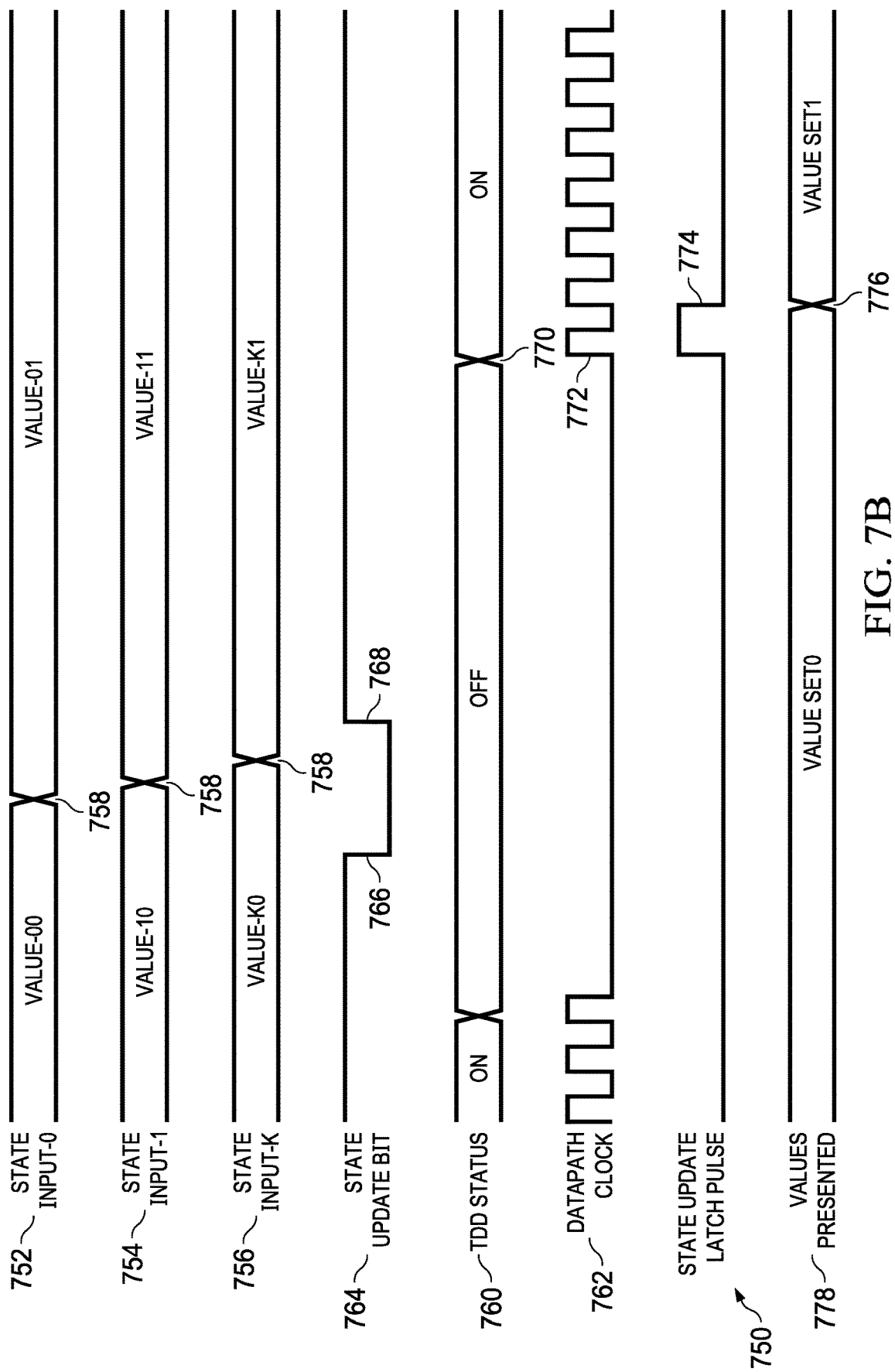
FIG. 7B is a timing diagram of the example CISUH, in accordance with aspects of the present disclosure.

FIG. 7A is discussed herein in conjunction with FIG. 7B, which is a timing diagram 750 of the example CISUH 700, in accordance with aspects of the present disclosure. Timing diagram 750, includes state inputs, state input-0 752, state input-1 754, through state input-K 756, which may all be presented at an input to a state latch flip-flops 724. The state inputs 752, 754, and 756 may be generated by another circuit or device that controls or adjusts the operation of the datapath module and the state inputs may be asserted substantially continuously when the settings reflected in the state inputs are to be applied by the datapath module. The values of the three state inputs may be changed at state update point 758. As shown, the state inputs may be presented serially so that state update point 758 for each state input may be slightly offset in time. The state inputs may be stored in one or more registers, such as registers on a controller, and presented to the datapath module as input to state latch flip-flops 724. A state update bit 764 may also be generated by another circuit or device and input at reset 708 of the asynchronous reset and synchronous set flip-flop 702. When a state update is input, the state update bit 764 may be pulled low 766 prior to the first state input change, here state input 0 752, and the state update bit 764 may be pulled high 768 after the last state input date, here state input 756.

A TDD status 760 represents whether the datapath module is in an ON state (e.g., clocked) or OFF state (clock gated). A datapath clock signal 762 illustrates the clock cycles during the ON state, as well as the lack of clock cycles received by the CISUH 700 (and corresponding datapath module) during the OFF state.

In accordance with aspects of the present disclosure, the state update bit 764 (shown as 722 in FIG. 7A) may be input to reset 708. When the reset 708 is asserted, e.g., when reset 708 is pulled low 766, the value at output Q 710 of the asynchronous reset and synchronous set flip-flop 702 may be cleared. This clearing may be independent of the clock signal 762, and, thus, the set value at output Q 710 of the asynchronous reset and synchronous set flip-flop 702 is cleared when reset 708 is pulled low 766. The value of output Q will remain cleared (e.g., 0) even after the reset 708 is pulled back high. The value of output Q will get set to the value at input D 704 only when clock is present. Since clock is gated during the OFF state and ungated when entering ON state, the value of output Q 710 will change from 0 to 1 when the system is entering the ON state. The value from output state Q 710 may be input at input D 714 of the rising edge detection circuit 712. When entering the on-state 770, the rising edge detection circuit 712 may detect the rising edge 772 of output Q 710 and output a state update pulse 774 from output Q 716 to the state latch flip-flops 724 to input the presented state input values 0-K 732. Thus, when entering the on-state 770 on the rising edge of output Q 710 from asynchronous reset and synchronous set flip-flop 702, the state input values asserted at state inputs 752, 754, and 756 after state update point 758 are input via state latch flip-flops 724.

In some examples, if the CISUH 700 is in an ON state during a state update, the state update bit 764 is pulled low 766, causing output state Q 710 to be cleared. Once the state update bit 764 is pulled back HIGH and on the next rising edge of clock signal 762 the state update latch pulse 774 is input to state latch flip-flops 724 (via connection 730) and state inputs 752, 754, and 756 (presented at state latch flip-flops 724) are input to the state latch flip-flops 724 of datapath module. The values presented 778 at state latch flip-flops 724 switches 776 from the loopback values presented at input 0 of mux 720 to the state input values 0-K 732 presented at input 1 of mux 720.

Figure 8:
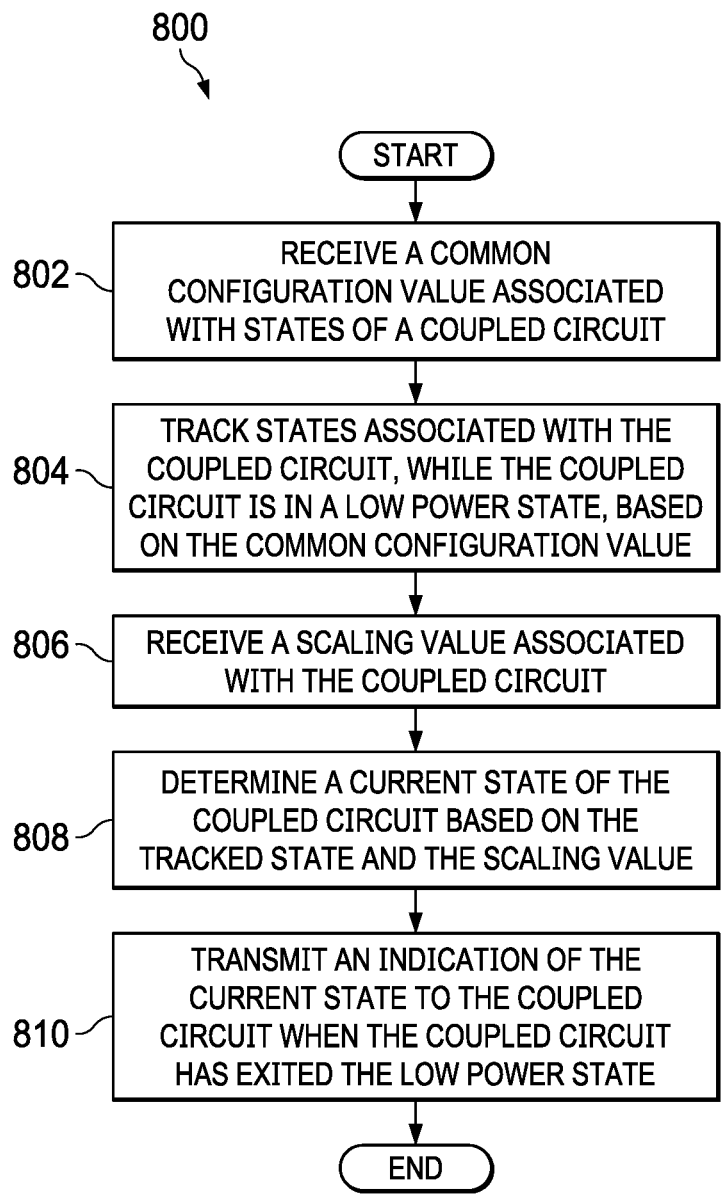
FIG. 8 is a flow diagram illustrating a technique for reinitializing a circuit, in accordance with aspects of the present disclosure.

FIG. 8 is a flow diagram illustrating a technique 800 for reinitializing a circuit, in accordance with aspects of the present disclosure. At block 802, common configuration value associated with states of a coupled circuit is received. In some examples, a combiner module, such as combiner 514 of state tracker 502 as shown in FIG. 5, receives a common configuration value, such as common $FCW_{LSB}$ 510. In some examples, this common configuration value is different from the configuration value received by a coupled circuit.

In some examples, the common configuration value may be an FCW. In some examples, the FCW may have a frequency that is an LCM of one or more other FCWs for the coupled circuits. For example, the common configuration value can be LCM of the configuration values of one of more of its coupled circuits. A clock value, clock frequency, counter value, etc. are other examples of possible configuration values. At block 804, a state associated with the coupled circuit is tracked based on the common configuration value while the coupled circuit is in a low power state. In some examples, an accumulator may be used to track the state. The state may be, for example, a phase, clock, control word, etc., of a coupled datapath module such as NCO 506. For example, a coupled circuit, such as a spur canceller, mixer, up-sampler, etc., may enter a low power state where the coupled circuit is clock gated. The coupled circuit may include one or more NCOs. In some examples, the state may be based on the FCW with the frequency that is the LCM of the other FCWs of the for the coupled circuits. For example, a state tracker circuit for tracking NCO phase may receive a common frequency control word to determine a common phase value.

In some examples, the circuit detects that the coupled circuit is exiting the low power state. For example, a reinitialization module, such as state re-initializer 504 of FIG. 5, may be clock gated and exit the low power state along with the corresponding coupled circuits when the clock is ungated. In some examples, the tracked state associated with the coupled circuit is received, for example, by the reinitialization module. The reinitialization module may sample the common state value of the state tracker when the reinitialization module exits the low power state. At block 806, a scaling value associated with the coupled circuit is received. For example, the reinitialization module may receive a value, such as multiplier 518, that may be used to reinitialize a coupled circuit as a function of the common state determined by the state tracker module and the scaling value. At block 808, a current state for a coupled circuit is determined based on the scaling value and the tracked state. For example, the current state may be determined as a function of the common state value and a scaling value by multiplier 520. At block 810, an indication of the current state is transmitted to the coupled circuit when the coupled circuit has exited the low power state. For example, the current state value may be seeded into an accumulator of an NCO of a coupled circuit.

Figure 9:
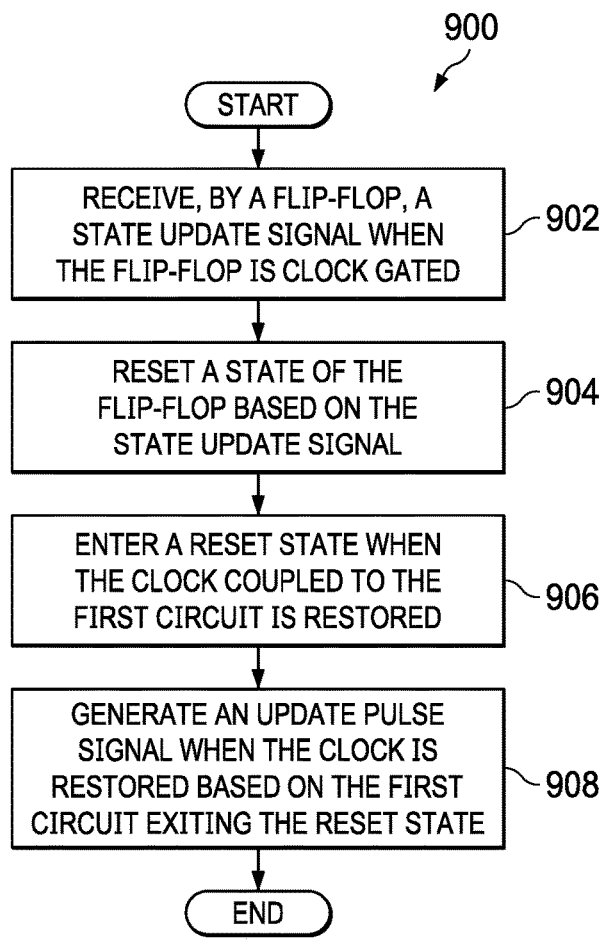
FIG. 9 is a flow diagram illustrating a technique for updating a state, in accordance with aspects of the present disclosure.

FIG. 9 is a flow diagram illustrating a technique 900 for updating a state, in accordance with aspects of the present disclosure. At block 902, a state update signal is received while a clock coupled to a first flip-flop is off. For example, a clock-gated flip-flop (for example a flip flop, such as flip-flop 702, with a coupled clock where the coupled clock is forced low, as shown in FIGS. 7A and 7B) may receive a state update signal on a reset pin. In some examples, the flip-flop may have an input tied to 1. At block 904, a reset state may be entered based on the received state update signal. For example, receiving a signal on the reset pin, such as reset 708, may cause the flip-flop to reset and will remain in reset even after the reset signal is de-asserted. At block 906, the reset state is exited when the clock coupled to the first circuit is restored. For example, when the clock, such as clock 706, is restored (e.g., ungated), the flip-flop may return to the input value of 1 and the output pin of the flip-flop may indicate that the flip-flop state has been reset as it becomes set to 1 when the clock is ungated. In some examples, a detector circuit coupled to the flip-flop may receive a clock signal when a clock is ungated. For example, when exiting the low power state, the clock is ungated and the detector circuit may receive a clock tick. A determination that the state of the flip-flop has changed may be made. For example, the detector circuit input may be coupled to the output of the flip-flop and the detector circuit may detect that the flip-flop state was reset due to state update pulse based on the changed of the flip-flop (e.g., from 0→1) and an output of the detector circuit may be set to 1. At block 908, a state update pulse signal is generated when the clock is restored based on the first circuit exiting the reset state. For example, the detector circuit, such as flip-flop 712, may generate and output a state update pulse, such as statue update latch pulse 730, to a coupled module if the detector circuit detects that the flip-flop state was reset and again set back to the input value of 1.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. Circuits described herein are reconfigurable to include additional or different components to provide functionality at least partially similar to functionality available prior to the component replacement.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

While the example embodiments suggest that certain elements are included in an integrated circuit while other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board Modifications are possible in the described embodiments, and other embodiments are possible, within the scope of the claims.

What is claimed is:

1. A reinitializing circuit, comprising:
    a state tracking module configured to:
        receive a common configuration value; and
        track a state associated with a coupled circuit while the coupled circuit is in a low power state based on the common configuration value, wherein the coupled circuit is coupled to the reinitializing circuit; and
    a reinitialization module coupled to the state tracking module, wherein the reinitialization module is configured to:
        receive the tracked state associated with the coupled circuit;
        receive a scaling value associated with the coupled circuit;
        determine a current state of the coupled circuit based on the tracked state and the scaling value; and
        transmit an indication of the current state to the coupled circuit when the coupled circuit has exited the low power state.

2. The circuit of claim 1, wherein the reinitialization circuit is configured to track the state based on a first configuration value that is different from a second configuration value used by the coupled circuit.

3. The circuit of claim 1, wherein the coupled circuit is configured to initialize the state of the coupled circuit based on the indication of the current state received from the reinitialization circuit.

4. The circuit of claim 1, wherein the common configuration value is predetermined based on a common factor of two or more configuration values of the coupled circuit.

5. The circuit of claim 4, wherein the reinitializing circuit is coupled to two or more coupled circuits and the common factor comprises a least common multiplier of the two or more configuration values associated with the two or more coupled circuits.

6. The circuit of claim 4, wherein the scaling value is preconfigured based on the common configuration value and a configuration value provided to the coupled circuit.

7. The circuit of claim 1, wherein the state tracking module is further configured to enter the low power state when the coupled circuit exits the low power state and exit the low power state when the coupled circuit enters the low power state.

8. A method for reinitializing a state of a coupled circuit by a reinitialization circuit, comprising:
    receiving a common configuration value associated with states of the coupled circuit;
    tracking states associated with the coupled circuit, while the coupled circuit is in a low power state, based on the common configuration value;
    receiving a scaling value associated with the coupled circuit;
    determining a current state of the coupled circuit based on the tracked state and the scaling value; and
    transmitting an indication of the current state to the coupled circuit when the coupled circuit has exited the low power state.

9. The method of claim 8, wherein the common configuration value that is different from a configuration value used by the coupled circuit.

10. The method of claim 8, wherein the common configuration value is predetermined based on a common factor of two or more configuration values of the coupled circuit.

11. The method of claim 10, wherein the common factor comprises a least common multiplier of two or more configuration values associated with two or more coupled circuits.

12. A reinitializing circuit, comprising:
    a state-tracking module configured to track a state of a first circuit when the first circuit transitions to an OFF-mode, and configured to receive a common value and generate a first value, the common value is based on one or more parameters of the first circuit; and
    a state-initialization module coupled to the state-tracking module and the first circuit, the state-initialization module configured to provide a current value to the first circuit when the first circuit transitions to an ON-mode, the current value is generated by the state-initialization module responsive to receiving a scaling value and the first value.

13. The reinitializing circuit of claim 12, wherein the scaling value is determined from the one or more parameters of the first circuit.

14. The reinitializing circuit of claim 12, wherein the first circuit is initialized based on the current value received from the state-initialization module.

15. The reinitializing circuit of claim 12, wherein the OFF-mode is when the first circuit is non-operational and ON-mode is when the first circuit performs normal operation.

16. The reinitializing circuit of claim 12, wherein the state-tracking module is further configured to enter a low-power state when the first circuit exits the OFF-mode and configured to exit the low-power state when the first circuit enters the ON-mode.

17. The reinitializing circuit of claim 12 is further configured to track a state of a second circuit, and the common value includes a least common multiplier of one or more parameters of the first circuit and of the second circuit.

18. A circuit comprising:
    a clock manager;
    a tracking module coupled to the clock manager and configured to track state of a first circuit and a second circuit when each of the first circuit and the second circuit are in low-power mode, the tracking module configured to receive a common configuration value and generate a first value, the common configuration value obtained from one or more parameters associated with the first circuit and the second circuit; and an initialization module coupled to the tracking module, the first circuit and the second circuit, the initialization module configured to provide a first current value to the first circuit when the first circuit transitions to a normal-operation mode and configured to provide a second current value to the second circuit when the second circuit transitions to a normal-operation mode.

19. The circuit of claim 18, wherein the initialization module is configured to generate:

the first current value responsive to receiving the first value and a first scaling factor; and the second current value responsive to receiving the first value and a second scaling factor.

20. The circuit of claim 19, wherein the first scaling factor and the second scaling factor are obtained from one or more parameters of the first circuit and the second circuit respectively.

21. The circuit of claim 18, wherein the clock manager is configured to provide the common configuration value to the tracking module, and the common configuration value is a least common multiple of a first parameter associated with the first circuit and a second parameter associated with the second circuit.

22. The circuit of claim 18, wherein the tracking module comprises:

a combiner configured to receive the common configuration value and the first value; and an accumulator coupled to the combiner and configured to store the first value.

* * * * *